United States Patent [19]

Yelverton

[11] Patent Number: 5,269,552
[45] Date of Patent: Dec. 14, 1993

[54] BICYCLE FRAME COMPOSITION

[75] Inventor: Forrest Yelverton, Huntington Beach, Calif.

[73] Assignee: GT Bicycles, Inc., Huntington Beach, Calif.

[21] Appl. No.: 940,175

[22] Filed: Sep. 3, 1992

[51] Int. Cl.5 ............................................. B62K 25/30
[52] U.S. Cl. .................................................... 280/283
[58] Field of Search ............... 280/283, 284, 285, 286, 280/281.1, 275, 274

[56] References Cited

U.S. PATENT DOCUMENTS

| | | | |
|---|---|---|---|
| 3,522,957 | 8/1970 | Topor | 280/283 |
| 3,982,770 | 9/1976 | Satoh et al. | 280/284 |
| 4,421,337 | 12/1983 | Pratt | 280/284 |
| 4,679,811 | 7/1987 | Shuler | 280/284 |
| 5,080,384 | 1/1992 | Groendal et al. | 280/283 |

FOREIGN PATENT DOCUMENTS

| | | | |
|---|---|---|---|
| 457480 | 5/1950 | Italy | 280/275 |
| 1283147 | 1/1987 | U.S.S.R. | 280/284 |
| 7430 | of 1914 | United Kingdom | 280/284 |

OTHER PUBLICATIONS

Guide to Suspension and High Performance, vol. 3, 1992 pp. 9, 13, 14, 15, 17, 30, 31, 36, 37, 42, 43, 44, 45, 47, 53, 60, 69, 71, 76, 85, 86, 87, 92, 96, 98, 100, 108, 109, 110, 111, 112, 117, & 119.
Mountain Bike Action, Oct. 1992, pp. 10, 25, 26, 28, 29, 31, 36, 37, 39, 40, 41, 44, 45, 47, 58, 70, 73, 76, 79, 123, & 130.
Mountain Biking, Nov. 1992, vol. 6, No. 11, pp. 6, 7, 8, 9, 25, 48, 40, 65, 71, 73, 108, 109, 115, 124, 129, 140, 143, 163 & 169.
Mountain Bike, Dec. 1992, pp. 1, 2, 5, 18, 44, 45, 46, 47, 48, 49, 77, 127, & 160.
Mountain Biking, Jan. 1993, vol. 7, No. 1, pp. 32, 33, 40, 45, 71, 75, 82, 83, 115, & 117.
Bicycling Biking, Nov. 1992 vol. 6, No. 11, pp. 6, 7, 8, 9, 25, 48, 49, 65, 71, 73, 108, 109, 115, 124, 129, 140, 143, 163, & 169.

Primary Examiner—Margaret A. Focarino
Assistant Examiner—Kevin Hurley
Attorney, Agent, or Firm—Stetina and Brunda

[57] ABSTRACT

A bicycle frame having shock absorbing characteristics. The bicycle frame generally comprises a head tube and a seat tube having an elongate crossbar rigidly attached thereto and extending therebetween. Rigidly attached to and extending between the seat tube and the crossbar is a shock absorber. The bicycle frame further includes first and second chain stay members having front ends pivotally connected to the opposed sides of an axle receiving sleeve attached to the lower end of the seat tube and rear ends adapted to support a tire axle therebetween. Additionally, first and second seat stay members are rigidly attached to and extend between the shock absorber and the rear ends of the chain stay members. Upon the exertion of a downward force to the seat tube, the chain stay members are caused to pivot upwardly thereby compressing the shock absorber via the movement of the seat stay members.

8 Claims, 3 Drawing Sheets

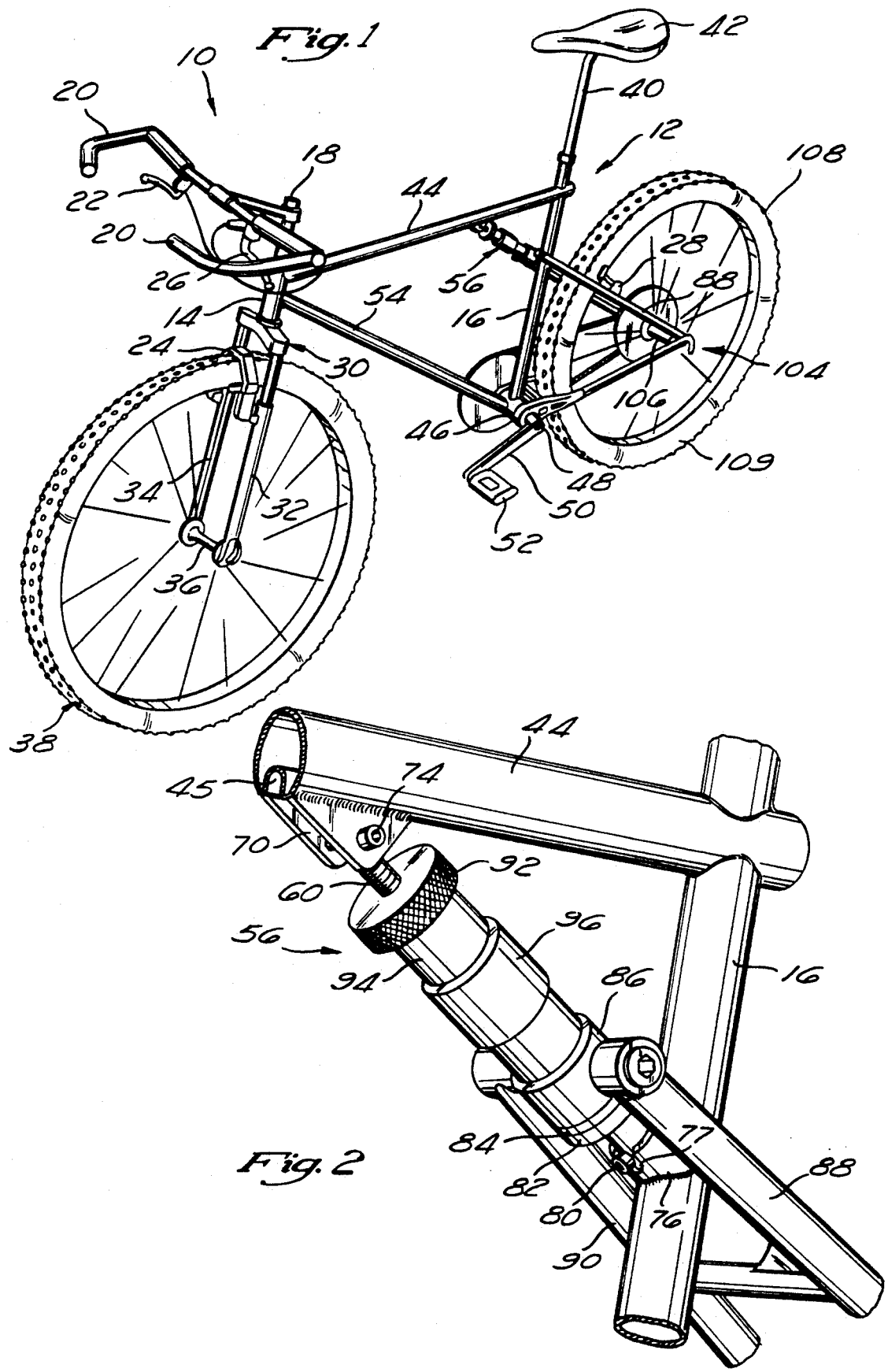

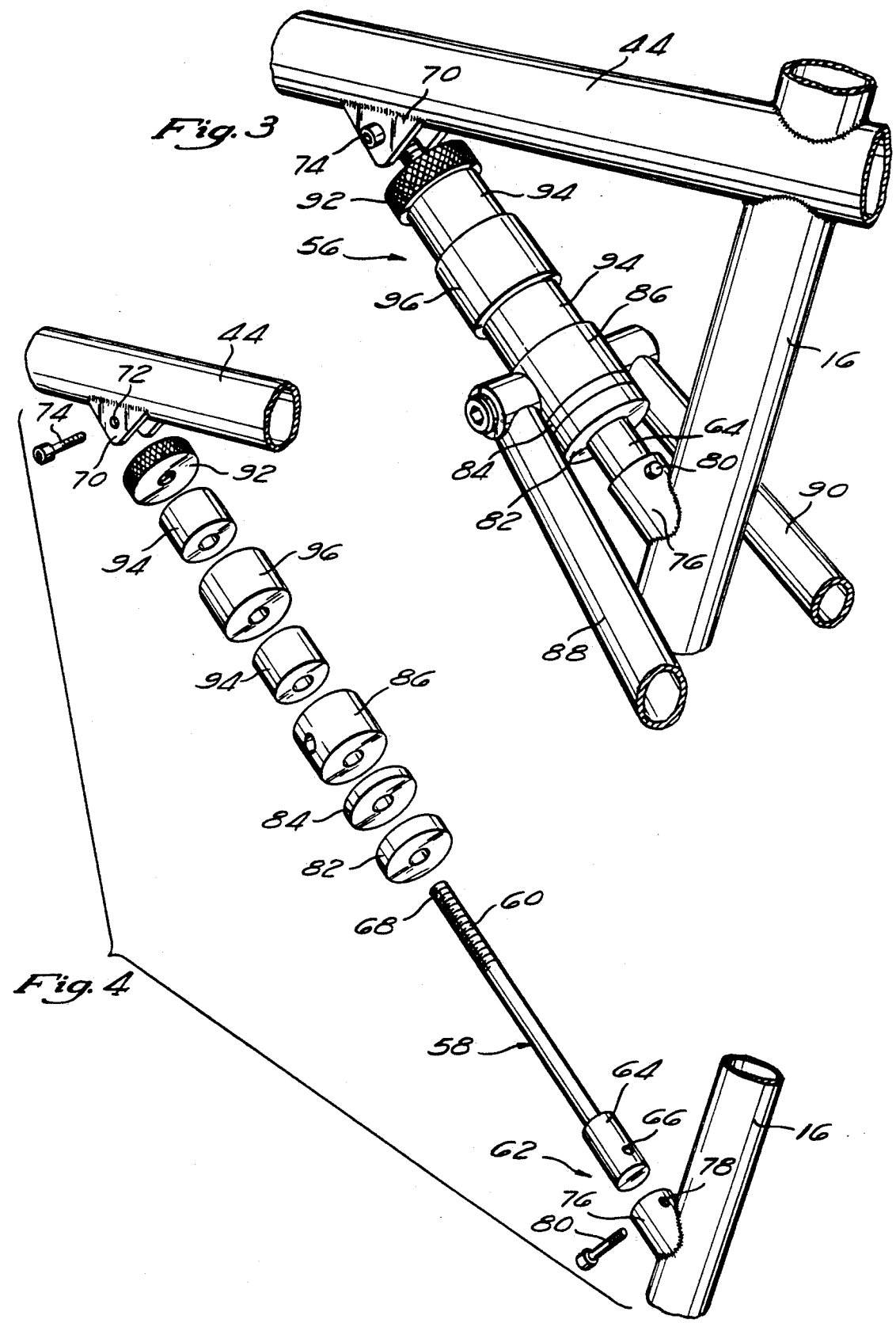

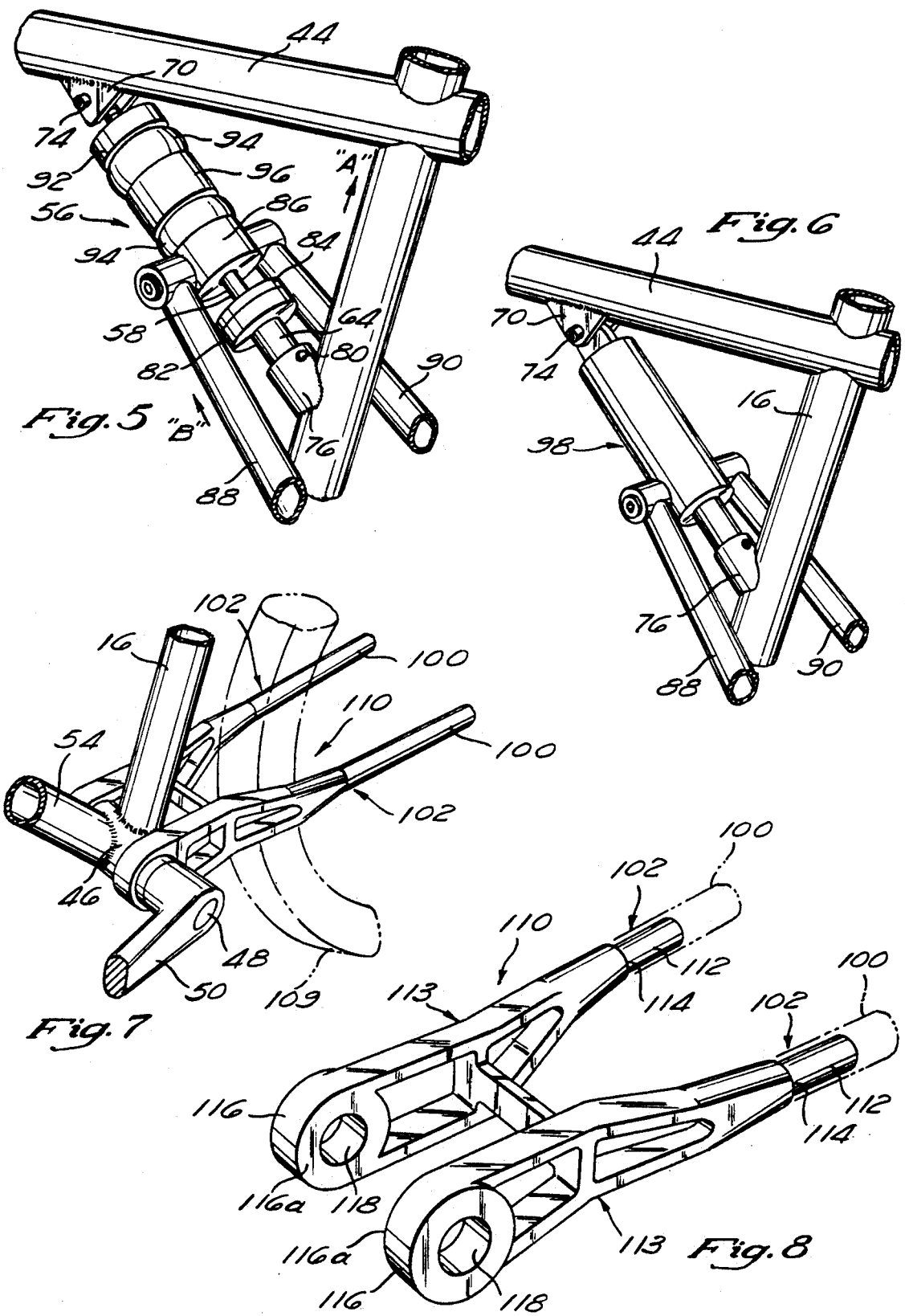

BICYCLE FRAME COMPOSITION

FIELD OF THE INVENTION

The present invention relates generally to bicycles, and more particularly to a bicycle possessing shock absorbing suspension characteristics.

BACKGROUND OF THE INVENTION

The primary structural component of a bicycle is the bicycle frame. Typically, the bicycle frame comprises an elongate crossbar which is rigidly secured to and extends between a head tube of the bicycle and a seat tube of the bicycle. The head tube typically provides a structural base for the stem of the bicycle to which the handle bars are attached. The seat tube provides a base for a seat post which is generally telescopically received therewithin and to which is secured the saddle or seat of the bicycle. In typical bicycle frame construction, the seat tube includes a generally cylindrical member attached to the lower end thereof which is adapted to receive the bottom bracket axle. The bottom bracket axle typically extends between and interconnects the cranks to which are attached the pedals. Rigidly secured to and extending between the head tube and the cylindrical axle receiving member is an elongate down tube. In addition to the aforementioned structural components, rigidly secured to and extending rearwardly from the axle receiving member are first and second chain stay members. Additionally, rigidly secured to and extending downwardly from the upper end of the seat tube are first and second seat stay members having distal ends which are rigidly secured to the rear ends of the first and second chain stay members. Typically, the distal ends of the seat stay members and rear ends of the chain stay members are interconnected in a manner adapted to receive the rear tire axle of the bicycle.

The foregoing description generally represents the construction of conventional prior art bicycle frames. Typically, when such prior art frames are constructed, the aforementioned structural components are rigidly secured to one another through the use of welding or brazing techniques. Though this method of constructing the bicycle frame provides the resultant frame with structural integrity, the bicycle frame does not possess a suspension having shock absorbing characteristics. As will be recognized, the riding comfort and performance of the bicycle would be greatly enhanced if the bicycle frame were adapted to at least partially accommodate the shocks routinely encountered while riding the bicycle. Though various prior art bicycle frames include front and/or rear shock absorbing assemblies, such bicycle frames possess certain deficiencies which detract from their overall utility. In this respect, the manner in which the rear shock absorbing assemblies are typically interfaced to the seat stay members of the frame creates a significant amount of lateral instability for the rear wheel of the bicycle. As will be recognized such instability severely diminishes the performance and handling characteristics of the bicycle. The present invention specifically overcomes these and other deficiencies associated with prior art bicycle frames.

SUMMARY OF THE INVENTION

In accordance with the preferred embodiment of the present invention, there is provided a shock absorbing bicycle frame adapted to provide a bicycle with enhanced riding comfort and performance. In accordance with the present invention, the bicycle frame preferably comprises a head tube having a top end and a bottom end, and an elongate seat tube having an upper end and a lower end. Rigidly attached to and extending between the head tube and the seat tube is an elongate, horizontally disposed crossbar. Additionally, rigidly attached to the lower end of the seat tube is an axle receiving sleeve which defines an axle receiving bore extending axially therethrough. Rigidly attached to and extending between the head tube and the axle receiving sleeve is an elongate down tube. The bicycle frame further comprises first and second chain stay members having front ends which are pivotally connected to opposed sides of the axle receiving sleeve and rear ends which are sized and configured to support a rear tire axle therebetween.

To facilitate the shock absorbing capability of the bicycle frame, a shock absorber is rigidly attached to and extends between the seat tube and the crossbar. Additionally, rigidly attached to and extending between the shock absorber and the rear ends of the chain stay members are first and second seat stay members. In the preferred embodiment, the shock absorber comprises an elongate rod having a partially threaded proximal end and a distal end. The proximal end is rigidly attached to the crossbar while the distal end is rigidly attached to the seat tube. Disposed about the rod and rigidly secured between the first second seat stay members is a shoulder member. The shock absorber further includes an adjustment member which is threadably received onto the threaded proximal end of the rod. Disposed about the rod between the shoulder member and the adjustment member is at least one compression member. In the preferred embodiment, the shook absorber includes first and second compression members which are preferably fabricated from polyurethane and separated by a spacer member which is also disposed about the rod. Importantly, the adjustment member is operable to selectively pre-compress the compression members to adjust the amount of shook absorption facilitated by the shock absorber. Alternatively, the shock absorber may comprise a compressible fluid piston/cylinder assembly.

In order for the shock absorber to function properly, the front ends of the first and second chain stay members are allowed to pivot relative the axle receiving sleeve. To facilitate the pivotal movement of the first and second chain stay members to the axle receiving sleeve, an adapter member is provided which is rigidly attached to the front ends of the first and second chain stay members. In the preferred embodiment, the adapter member includes first and second annular bearing portions having apertures extending therethrough. The apertures are positioned about the axle receiving sleeve such that the bearing portions are in abutting contact with the opposed sides of the axle receiving sleeve and the apertures are coaxially aligned with the bore extending through the axle receiving sleeve. As such, upon encountering an upward force upon the rear wheel of the bicycle, the chain stay members may moderately pivot about the axle receiving sleeve in an amount dependent upon the compressive resistivity of the compression members thereby providing an articulated rear suspension for the bicycle.

BRIEF DESCRIPTION OF THE DRAWINGS

These as well as other features of the present invention will become more apparent upon reference to the drawings wherein:

FIG. 1 is a perspective view of a bicycle incorporating a bicycle frame constructed in accordance with the present invention;

FIG. 2 is a front perspective view of the shock absorber extending between the seat tube and crossbar components of the bicycle frame;

FIG. 3 is a rear perspective view of the shock absorber extending between the seat tube and crossbar components of the bicycle frame;

FIG. 4 is an exploded view of the shook absorber shown in FIGS. 2 and 3;

FIG. 5 is a rear perspective view of the shock absorber illustrated in FIGS. 2 and 3 in a compressed state;

FIG. 6 is a rear perspective view of an alternative embodiment of the shock absorber;

FIG. 7 is a partial perspective view of the adapter member used to attach the front ends of the chain stay members to the axle receiving sleeve of the bicycle frame; and FIG. 8 is a perspective view of the adapter member shown in FIG. 7.

DETAILED DESCRIPTION OF THE PREFERRED EMBODIMENT

Referring now to the drawings wherein the showings are for purposes of illustrating preferred embodiments of the present invention only, and not for purposes of limiting the same, FIG. 1 perspectively illustrates a bicycle 10 incorporating a bicycle frame 12 constructed in accordance with the present invention. The bicycle frame 12 generally comprises a head tube 14 disposed at the front end of the bicycle 10 and a seat tube 16 disposed at the rear end of the bicycle 10. Connected to the top end of the head tube 14 is a stem 18 to which is attached the handle bars 20. Additionally, connected to the handle bars 20 is a first brake lever 22 which controls the front brake 24 via a first brake cable and a second brake lever 26 which controls the back brake 28 via a second brake cable. Though not shown, a first shifter used to control the front sprocket derailleur of the bicycle 10 via a first shifter cable and a second shifter used to control the rear sprocket derailleur of the bicycle 10 via a second shifter cable may be provided. Connected to the bottom end of the stem 18 is a conventional front shock absorber assembly 30 defining a first fork 32 and a second fork 34 between which is mounted the axle 36 of the front wheel 38. Importantly, the front shook absorber assembly 30 is adapted to provide the compressive first fork member 32 and second compressive fork member 34 with shock absorbing capability. Telescopically received into the top end of the seat tube 16 is a seat post 40 having a saddle or seat 42 connected thereto.

Rigidly attached to and extending between the head tube 14 and seat tube 16 is an elongate, horizontally disposed crossbar 44. Additionally, rigidly attached to the bottom end of the seat tube 16 is an axle receiving sleeve 46 which defines an axle receiving bore (not shown) extending axially therethrough. In the preferred embodiment, axle receiving sleeve 46 has a generally cylindrical configuration and is attached to the lower end of seat tube 16 via a brazed or welded connection. The bore of the axle receiving sleeve 46 is sized and configured to receive a bottom bracket axle 48 of the bicycle 10. Attached to the opposed ends of the bottom bracket axle 48 are first and second cranks 50 to which are attached pedals 52. Rigidly attached to and extending between the head tube 14 and axle receiving sleeve 46 is an elongate down tube 54. In the preferred embodiment, head tube 14, seat tube 16, crossbar 44, axle receiving sleeve 46, and down tube 54 each have generally cylindrical configurations and are secured to one another via welded or brazed connections.

Referring now to FIGS. 2-5, rigidly attached to and extending between the seat tube 16 and crossbar 44 is a shock absorber 56. Shock absorber 56 generally comprises an elongate rod member 58 having a partially threaded proximal end 60 and a distal end 62 having a cylindrical member 64 positioned thereon. Extending transversely through the cylindrical member 64 is an aperture 66 while extending transversely through the threaded proximal end 60 of rod member 58 is an aperture 68. To facilitate the rigid attachment of rod member 58 to the crossbar 44 and seat tube 16, the threaded proximal end 60 is disposed within a bracket 70 welded to the underside of the crossbar 44 in a manner wherein the aperture 68 is coaxially aligned with a pair of apertures 72 disposed in the bracket 70. The bracket 70 is welded to the crossbar 44 in a orientation adjacent an elongate groove 45 formed in the underside of crossbar 44. The groove 45, which is disclosed in the co-pending United States Patent application of applicant entitled "BICYCLE CONSTRUCTION WITH GROOVED STRUCTURAL MEMBER" is used to provide a passage for the rear brake cable and front and rear sprocket derailleur cables to the rear end of the bicycle 10. Thereafter, a fastener such as a screw 74 is inserted into the coaxially aligned apertures 68, 72, thus rigidly securing the proximal end 60 of the rod member 58 to the bracket 70. The cylindrical member 64 disposed on the distal end 62 of the rod member 58 is slideably received into a sleeve 76 which is welded to the front side of the seat tube 16 and includes a pair of coaxially aligned apertures 78 extending therethrough. Particularly, the cylindrical member 64 is oriented within the sleeve 76 in a manner wherein the aperture 66 disposed therein is coaxially aligned with the apertures 78. Thereafter, a fastener such as a screw 80 is inserted into the coaxially aligned apertures 66, 78, thus rigidly securing the distal end 62 of the rod member 58 to the sleeve 76. Advantageously, sleeve member 76 preferably includes a slot 77 formed in the underside thereof to accommodate the head of the fastener 80.

Disposed about the rod member 58 are a plurality of components, each of which preferably have generally cylindrical configurations and include apertures extending axially therethrough which are sized to receive the proximal end 60 of the rod member 58. Particularly, these components include a shoulder member 82 which is received onto the rod member 58 and axially positioned therealong so as to come into abutting contact with the cylindrical member 64 disposed on the distal end 62. Disposed on the rod member 58 immediately adjacent shoulder member 82 and in abutting contact therewith is a ring member 84. In the preferred embodiment, shoulder member 82 and ring member 84 are preferably fabricated from a rigid material such as steel or aluminum.

Also disposed upon the rod member 58 is a stay member 86 which is used to facilitate the attachment of a first seat stay 88 and a second seat stay 90 to the shock absorber 56 in a manner which will be described in greater detail below. An adjustment member 92 is threadably received onto the threaded proximal end 60 of rod member 58 and is provided with a knurled outer surface. Disposed about the rod member 58 between the adjustment member 92 and stay member 86 are first and second compression members 94 which are separated by a spacer member 96 also disposed about the rod 58. In the preferred embodiment, compression members 94 are fabricated from polyurethane, though other materials having shock absorbing, compressive capabilities may be utilized as an alternative. Additionally, compression members 94 are preferably fabricated having an outer diameter dimension slightly less than the outer diameter dimensions of the stay member 86, spacer member 96 and adjustment member 92. Due to the threaded interface of adjustment member 92 to the proximal end 60 of rod member 58, adjustment member 92 may be utilized to axially "precompress" the compression members 94 by rotating adjustment member 92 in a clockwise direction so as to move axially along rod member 58 toward the stay member 86. As will be explained in greater detail below, by pre-compressing the compression members 94, the shook absorbing capability of the bicycle frame 12 may be adjusted to provide greater or lessor travel of the rear wheel of the bicycle relative the frame. It will be recognized, that more or less than two (2) compression members 94 may be utilized in the construction of shock absorber 56.

Referring now to FIG. 6, as an alternative to the shock absorber 56 shown and described in FIGS. 2-5, the bicycle frame 12 may be provided with a shock absorber 98 which is rigidly attached to and extends between the crossbar 44 and seat tube 16. In this embodiment, the shock absorber 98 comprises a conventional compressible fluid piston/cylinder, portions of which are rigidly secured to the bracket 70 attached to crossbar 44 and the sleeve 76 attached to seat tube 16 in the same manner as previously described, i.e. through the receipt of fasteners into coaxially aligned sets of apertures. Additionally, rigidly attached to the shook absorber 98 are the first seat stay 88 and second seat stay 90.

Referring now to FIGS. 1, 7 and 8, pivotally connected to the opposed sides of axle receiving sleeve 46 are first and second chain stay members 100 having a front ends 102 and a rear ends 104. As best seen in FIG. 1, the ends of first seat stay 88 and second seat stay 90 opposite those attached to shock absorber 56 are rigidly connected to the rear ends 104 of chain stay members 100. Additionally, the rear ends 104 of chain stay member 100 are adapted to receive the rear axle 106 of the back wheel 108. In the preferred embodiment, the pivotal connection of the chain stay members 100 to the opposed sides of the axle receiving sleeve 46 is facilitated by an adapter member 110 rigidly attached to the front ends 102 of chain stay members 100. As best seen in FIG. 8, adapter member 100 is a unitary, forged or cast structure comprising a pair of annular projections 112 which are separated by a pair of annular bearing portions 116 by a pair of angled middle portions 113. Extending between the middle portions 113 is a cross portion 115. The attachment of adaptor member 110 to the front ends 102 is preferably facilitated by the annular projections 112 formed thereon which are sized and configured to be received into the front ends 102. In this respect, when the annular projections 112 are fully received into the chain stay members 100, the front ends 102 are abutted against shoulders 114 defined by the projections 112 and secured thereto via a welding or brazing process.

Extending through the first and second annular bearing portions 116 are coaxially aligned apertures 118. In the preferred embodiment, the adaptor member 110 is positioned about the axle receiving sleeve 46 in a manner wherein the inner surfaces 116a of the bearing portions 116 are in abutting contact with the opposed sides of the axle receiving sleeve 46 and the apertures 118 are coaxially aligned with the bore extending through the axle receiving sleeve 46. As such, the apertures 118 and bore extending through the axle receiving sleeve 46 are aligned so as to receive the bottom bracket axle 48. As previously indicated, the bearing portions 116 of adaptor member 110 are adapted to pivot relative the axle receiving sleeve 46. As such, the interface of the adaptor member 110 to the axle receiving sleeve 46, as well as the interface of the bottom bracket axle 48 and cranks 50 to the adaptor member 110, allows such pivotal movement of the adaptor member 110 relative the axle receiving sleeve 46 to occur. The need for this pivotal movement will be explained "in greater detail below. In certain types of bicycles, and particularly in mountain bicycles, the tires of the bicycle are of substantially greater width than conventional bicycle tires. Advantageously, as seen in FIG. 7, the adapter member 110 is specifically configured to accommodate a wide rear tire 109 and to provide a clearance between the tire 109 and chain stay members 100 sufficient to prevent a build-up of mud or dirt therebetween. As will be recognized, such clearance is facilitated by the outwardly angled middle portions 113 of the adapter member 110. As previously specified, the bicycle frame 12 of the present invention is adapted to possess shock absorbing suspension characteristics. Particularly, when an upward force is applied to the rear tire 109 as would occur from the force generated when the bicycle 10 hits a bump or other obstruction in it's path, the upward force generated through the seat tube 16 (in the direction A indicated in FIG. 5) causes the chain stay members 100 to pivot upwardly relative the axle receiving sleeve 46 in a counter clockwise direction as viewed in FIG. 1. As will be recognized, this pivotal movement of the chain stay members 100 is facilitated by the interface of the adaptor member 110 to the axle receiving sleeve 46. Due to the rigid connection of the seat stays 88, 90 to the rear ends 104 of the chain stay members 100, the upward movement of the chain stay members 100 causes the seat stays 88, 90 to move in the direction designated by the arrow B shown in FIG. 5. Importantly, this movement of the seat stays 88, 90 causes the stay member 86 (to which the seat stays 88, 90 are rigidly secured) to move axially along rod member 58 in a direction toward the proximal end 60 thereof which is secured to crossbar 44 As will be recognized, this movement of the stay member 86 serves to compress the compression members 94 between the stay member 86, spacer member 96, and adjustment member 92. Due to the internal compressive resistance of the compression members 94, the compression members 94 are operable to absorb and dissipate the compressive force exerted thereupon by the upward axial movement of the stay member 86. Advantageously, the compressive force dissipating effects of the compression members 94 serves to dampen the force transmitted through the bicycle frame 12 thus absorbing the shock encountered by the bump or obstruction in the bicycle path. After compression of the compression members 94, the internal resiliency of the compression members 94 causes the chain stays 100 to pivot in a clockwise direction back to their initial orientation.

As previously indicated, the shock absorbing capacity of the bicycle frame 12 may be adjusted via the selective adjustment of the adjustment member 92. In this respect, due to the threaded connection of the adjustment member 92 to the proximal end 60, the rotation of the adjustment member 92 in a clockwise direction causes the adjustment member 92 to move axially downwardly along rod member 58 toward stay member 86. Such movement serves to "pre-compress" the compression members 94. As can be appreciated, as the pre-compression of the compression members 94 is increased, the stiffness of the suspension, i.e. shock absorbing capacity of the bicycle frame 12, is varied. As the pre-compression of the compression members 94 is decreased via the counter-clockwise rotation of the adjustment member 92, the shock absorbing capacity of the bicycle frame 12 is increased. Advantageously, the combination of the shock absorber 56 with the front shock absorber assembly 30 of the bicycle 10 provides the bicycle 10 with the capacity to absorb the shocks encountered from traveling over bumps or obstructions in the bicycle path.

As will be recognized, the arrangement of the structural components of the bicycle frame 12 in the aforementioned manner serves to define three triangles. In this respect, a first triangle is defined by the crossbar 44, the down tube 54 and the seat tube 16. A second triangle is defined by the rear portion of the crossbar 44, the upper portion of the seat tube 16 and the shock absorber 56. Finally, a third triangle is defined by the seat stays 88, 90, the chain stay members 100 and the lower portion of the seat tube 16.

Importantly, though the bicycle frame 12 is provided with a shock absorber 56 interfaced to the seat stays 88, 90 thereof, the lateral stability of the rear wheel 108 is maintained. As previously specified, the rod member 58 of the shook absorber 56 is rigidly attached to and extends between the crossbar 44 and seat tube 16. Additionally, the upper ends of the seat stays 88, 90 are rigidly secured to opposed sides of the stay member 86. Though the stay member 86 is axially moveable along the rod member 58, the stay member 86 is not laterally moveable relative thereto, nor is the rod member 58 laterally movable due to its rigid attachment to the crossbar 44 and seat tube 16. Thus, though the seat stays 88, 90 are also axially movable relative rod member 58 to compress the compression members 94, the seat stays 88, 90 are also prevented from moving laterally due to their attachment to the stay member 86. As also previously specified, the lower ends of the seat stays 88, 90 are rigidly connected to the rear ends 104 of the chain stay members 100, while the front ends 102 of the chain stay members 100 are interfaced to the adapter member 110. Additionally, the rear ends 104 are adapted to receive the rear axle 106 of the back wheel 108. Though the adapter member 110 is pivotally moveable relative the axle receiving sleeve 46, the abutment of the inner surfaces 116a of the bearing portions 116 to the axle receiving sleeve 46 prevents any lateral movement of the adapter member 110 relative thereto. As such, the chain stay members 100 are likewise prevented from moving laterally. Thus, since the seat stays 88, 90 are rigidly connected to the rear ends 104 of the chain stay members 100 and neither the seat stays 88, 90 or chain stay members 100 are laterally movable, the rear tire 108 interfaced to the rear ends 104 is also prevented from moving laterally.

Additional modifications and improvements of the present invention may also be apparent to those skilled in the art. Thus, the particular combination of parts described and illustrated herein is intended to represent only one embodiment of the invention and is not intended to serve as limitations of alternative devices Within the spirit and scope of the invention.

What is claimed is:

1. A shock absorbing bicycle frame, comprising:
   a head tube having a top end and a bottom end;
   an elongate seat tube having an upper end and a lower end;
   an elongate, horizontally disposed crossbar rigidly attached to and extending between said head tube and said seat tube;
   an axle receiving sleeve rigidly attached to said lower end of said seat tube, said axle receiving sleeve defining an axle receiving bore extending axially therethrough;
   an elongate down tube rigidly attached to and extending between said head tube and said axle receiving sleeve;
   a shock absorber attached to and extending between said seat tube and said crossbar;
   first and second chain stay members having front ends pivotally connected to opposed sides of said axle receiving sleeve and rear end's sized and configured to support a rear tire axle therebetween; and
   first and second seat stay members attached to and extending between said shock absorber and the rear ends of said chain stay members.

2. The frame of claim 1 wherein said shook absorber comprises:
   an elongate rod having a partially threaded proximal end and a distal end, said proximal end being rigidly attached to said crossbar and said distal end being rigidly attached to said seat tube;
   a stay member disposed about said rod and rigidly secured to and between said first and second seat stay members, said stay member being axially movable relative said rod;
   an adjustment member threadably received onto said threaded proximal end of said rod; and
   at least one compression member disposed about said rod between said stay member and said adjustment member;
   said adjustment member being operable to selectively pre-compress said compression member.

3. The frame of claim 2 wherein said shock absorber includes plural compression members disposed between said stay member and said adjustment member.

4. The frame of claim 3 wherein said plural compression members are fabricated from polyurethane.

5. The frame of claim 1 wherein said shock absorber comprises a compressible fluid cylinder.

6. The frame of claim 1 further comprising an adaptor member rigidly attached to the front ends of said first and second chain stay members, said adaptor member including first and second annular bearing portions having apertures extending therethrough, said adaptor member being positionable about said axle receiving sleeve such that said bearing portions are in abutting oontact with and pivotal relative to the opposed sides of said axle receiving sleeve and said apertures are coaxially aligned with said bore.

7. The frame of claim 6 wherein said adapter member further includes first and second angled portions extending between said bearing portions and the front ends of said first and second chain stay members, said angled portions being sized and configured to provide clearance between said first and second chain stay members and the rear tire of the bicycle.

8. A shock absorbing bicycle frame, comprising:
   a head tube having a top end and a bottom end;
   an elongate seat tube having an upper end and a lower end;
   an elongate, horizontally disposed crossbar rigidly attached to and extending between said heat tube and said seat tube;
   an axle receiving sleeve rigidly attached to said lower end of said seat tube, said axle receiving sleeve defining an axle receiving bore extending axially therethrough;
   an elongate down tube rigidly attached to and extending between said heat tube and said axle receiving sleeve;
   a shock absorber attached to and extending between said seat tube and said crossbar;
   first and second chain stay members having front ends pivotally connected to opposed sides of said bicycle frame and rear ends sized and configured to support a rear tire axle therebetween; and
   first and second seat stay members attached to and extending between said shock absorber and the rear ends of said chain stay members.

* * * * *